United States Patent [19]

Schneider et al.

[11] Patent Number: 4,686,530
[45] Date of Patent: Aug. 11, 1987

[54] CABLE TRANSMISSION OF SIGNALS

[75] Inventors: Arthur Schneider, Braunschweig; Walter Baum; Hermann Zehl, both of Hanover, all of Fed. Rep. of Germany

[73] Assignee: Kabelmetal Electro GmbH, Hanover, Fed. Rep. of Germany

[21] Appl. No.: 408,822

[22] Filed: Aug. 17, 1982

[30] Foreign Application Priority Data

Aug. 3, 1981 [DE] Fed. Rep. of Germany ....... 3128498

[51] Int. Cl.$^4$ ...................... G08C 19/06; G08C 19/02; G08B 21/00
[52] U.S. Cl. .................. 340/870.31; 340/870.16; 340/870.29; 324/120
[58] Field of Search ............... 324/120, 96, 174, 207, 324/208; 340/870.16, 870.18, 870.29, 870.31; 250/215, 551, 227, 239; 455/603, 611, 617

[56] References Cited

U.S. PATENT DOCUMENTS

| | | | |
|---|---|---|---|
| 3,363,174 | 1/1968 | Hudson | 324/96 |
| 3,780,313 | 12/1973 | Wiegand | 324/174 |
| 3,991,367 | 11/1976 | Chapman | 324/96 |
| 4,119,948 | 10/1978 | Ward | 340/870.29 |
| 4,249,264 | 2/1981 | Crochet | 455/617 |
| 4,313,226 | 1/1982 | Blackington | 455/617 |
| 4,368,385 | 1/1983 | Kanbe | 250/551 |
| 4,386,268 | 5/1983 | Kock | 250/239 |
| 4,386,315 | 5/1983 | Young | 324/96 |
| 4,427,879 | 1/1984 | Becher | 250/551 |

OTHER PUBLICATIONS

"Wiegand Effect Pushing Its Way into Real Products", Electronics/Apr. 14, 1977.
"Wiegand Wire: New Material for Magnetic-Based Devices", Phillip E. Wigen, Electronics/Jul. 10, 1975.

Primary Examiner—John W. Caldwell, Sr.
Assistant Examiner—Tyrone Queen
Attorney, Agent, or Firm—Ralf H. Siegemund

[57] ABSTRACT

A light conductor has two sealed embedding elements molded to its ends, respectively containing a light emitter and a light receiver. The light emitter is connected to a likewise embedded Wiegand probe, the light receiver is connected to a likewise embedded amplifier and a pulse shaper. These signal transmission lines are used for data acquisition, the respective Wiegand probes are disposed to be responsive to measured conditions represented by variable magnetic fields. The transmission system is moisture-proof and insensitive to interfering electromagnetic radiation.

8 Claims, 6 Drawing Figures

CABLE TRANSMISSION OF SIGNALS

BACKGROUND OF THE INVENTION

The present invention relates to the transmission of information signals between a transmitter and a receiver or between a source and a destination for information signals.

Generally speaking the conduction of voltages, of a current or even of low level signals is in cases provided through electrical conductors which are insulated and end in plug elements having contact plugs and/or sockets which are electrically connected to the conductors. Extension cords and twin conductors of this type are of course conventional for the transmission of electrical power, but the same principle is also being used for other transmission of low level electrical signals such as measuring signals or the like and include the connection between a transducer providing certain measuring functions and a receiver for the measuring signal processing the signal further. A particular field of art is for example the electrical system including a measuring system in an automobile for determining the upper dead center, for controlling an antiblocking system for brakes and other functions to be monitored. To an increasing extent microprocessors are used in automobiles for purposes of monitoring and controlling operating functions and critical data such as firing angle, the launch time of a firing signal, the circuit breaker, the speed of the engine of the vehicle, of an automatic transmission or the like.

The foregoing already indicates that in cases the transmission of signal involves higher frequency signals or signals which run through an environment in which the conduction of the signal may encounter interference. For this purpose it is necessary to completely shield the electrical conductor and of course the equipment at either end may also require complete and adequate shielding. This involves for example also the shielding of the microprocessor because the operating power level of such a processor is quite low so that interfering signals may readily be received unless, as stated, the microprocessor is very securely shielded. Generally speaking, if a system is provided in which so to speak a microprocessor is the central unit and from which a number of conductors run to various measuring points, the likelihood is rather high that any of these conductors operate as an antenna and picks up interfering signals and voltages from the environment. In addition, it has to be considered that in some circumstances and instances the signals themselves are of a high frequency nature so that ordinary conductors are no longer suitable.

It can readily be seen that a system in which a central unit is provided for gathering a plurality of information and measuring data from more or less distant points and which is forced to operate in an environment which is subjected or subjectable to a considerable extent to a high degreee of interference, the entire system must be shielded with no possibility of any leakage point anywhere. This is basically a considerable expense and the mere transmission of measuring signals is thus already an expensive task.

With these and other objects in view, the invention consists of the construction, arrangement, and combination of the various parts of the device serving as an example only of one or more embodiments of the invention, whereby the objects contemplated are attained, as hereinafter disclosed in the specification and drawings, and pointed out in the appended claims.

DESCRIPTION OF THE INVENTION

It is an object of the present invention to provide for a new and improved transmission of signals between a transmitting end and a receiving end for purposes of operating in an environment which produces electromagnetic interference but the transmission is to be carried out without being encumbered by such interference.

It is another object of the present invention to provide a new and improved transmission cable for signals.

It is a further object of the present invention to provide a new and improved system for remote measuring and transmission of the measuring results by a cable.

It is a still further object of the present invention to provide a new and improved data acquisition system for monitoring a plurality of different conditions, possibly in a highly electromagnetically interfering environment.

In accordance with the preferred embodiment of the present invention, it is suggested to provide, as a basic signal transmission element, a light conductor such as a single conductor or a bundle of light conducting fibers. This light conductor has an entrance end and an exit end. The entrance end is disposed adjacent a light emitting device being electrically connected to a magnetically operating electric pulse generator preferably of the Wiegand type and these two elements as well as the entrance window of the light conductor are sealingly embedded in an electrically insulating and moisture proofing material such that a comparatively thin wall portion is set up adjacent the magnetic field responsive device so that an external magnetic field can operate the generator. This particular end including the sealed in portion is disposed to be responsive to a physically movable condition represented by a locally variable magnetic field. The other end of the light conductor, i.e., the exit window is disposed adjacent a light detector which is connected to an electric circuit preferably including an amplifier and a pulse forming device, and these elements are embedded in a sealed insulating body. Connector elements such as contact pins or sockets are connected to terminals inside this body but are electrically and physically accessible on the outside without endangering the sealing integrity or the embedment. This latter plug type configuration is connected to a microprocessor for purposes of acquisition of the information which is being transmitted through the cable in form of a light signal.

The particular signal transmission system as per the invention therefore has as its salient element a light conducting 'cable' and at their respective ends are sealingly embedded light transmitter portions and light receiver portions. A receiver portion converts the optical signal into an electrical signal of suitable level. The light transmitter portion converts a variable magnetic field into an optical signal. This particular transmission system is therefore free from a variety of interferences. First of all the transmitter and receiver sides are physically, i.e. D.C.-conductively decoupled. Moreover, this particular conductor of a signal does not function as an antenna capable of picking up electromagnetic stray fields.

The electrically insulated and insulating and sealing materials and bodies as per the invention are preferably made through molding processes which today can be made in a very simple manner. The light conductor itself should have an insulating cover which usually can readily be made of conventional electrically insulating material. Such cover material in turn provides adequate moisture protection and the cover ends and is sealingly engaged, connected, bonded or even fused to the sealing bodies at the respective ends of the conductor. The insulating layer can be made in an endless fashion, cut to a suitable length, stripped at the ends for purposes of juxtaposing the transmitter and receiver elements whereupon these elements are embedded in the sealing material as the respective bodies are formed, establishing in fact a uniform construction from end to end. The particular device is therefore not only insensitive against electromagnetic interference but is as a whole protected against moisture. In fact the only access, so to speak, is provided at one end where, for example, electrical connector pins emerge from the respective sealing body.

While applicable in principle to a variety of applications and usages, it should be mentioned that the preferred pulse generator to be employed is the so called Wiegand probe. Such a device is described, for example, in German printed patent application 2,143,327. The Wiegand probe consists of a magnetic core made of two different materials around which are coiled wires. A magnetic field which acts upon the particular assembly results in the production of a current pulse which is in fact independent from the speed of the variation of the magnetic field as applied. It is of particular advantage here that the Wiegand probe does note require any operating voltage, but uses the field it detects for generating the power of its output. This is of particular advantage because the Wiegand probe as well as the light emitting diode and possibly additional auxiliary circuit element can be completely enclosed without any feed-through provision. Further reference to Wiegand probes are found, e.g. in 'Wiegand effect pushing . . .', Electronics, Apr. 14, 1977, pp. 39-40; 'Wiegand wire,..., Electronics, July 10, 1975, p. 100 and p. 105; and U.S. Pat. No. 3,602,906.

The particular light transmitter element can be a luminescing diode or a laser diode which elements have a particular threshold so that in a rather simple manner light pulses can be provided. In cases, the output level of the Wiegand probe may be insufficient so that an additional voltage feed into the particular sealed body has to be provided for which of course is also made in a sealed manner. Alternatively, one can use the fact that during operation on output voltage is usually succeeded or preceded or both by voltage output of the probe in opposite direction. This particular situation can be used, for example, to charge a capacitor being likewise embedded at that particular end of the light conductor so that following the reversal of the output voltage of the Wiengand probe as an indication of a particular measuring situation, the capacitor voltage is added to that output voltage of the Wiegand probe and that may well be sufficient to drive the light emitting transmitter.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Proceeding now to the description of the drawings it is pointed out generally that the invention is to be used wherever signals are to be transmitted from a transmitter to a receiver under conditions which make sure that electrical external interference will not affect the transmission in any manner whatsoever. Morever, the particular system and its components are constructed in order to provide physical separation, i.e., decoupling as between receiver and transmitter. The inventive system is described by way of reference to an employment within an electrical monitoring system for automobiles but other fields of employment are of course readily discernable and this description is by way of example only and is not to be understood to be restrictive in any manner whatsoever.

Figure 1:
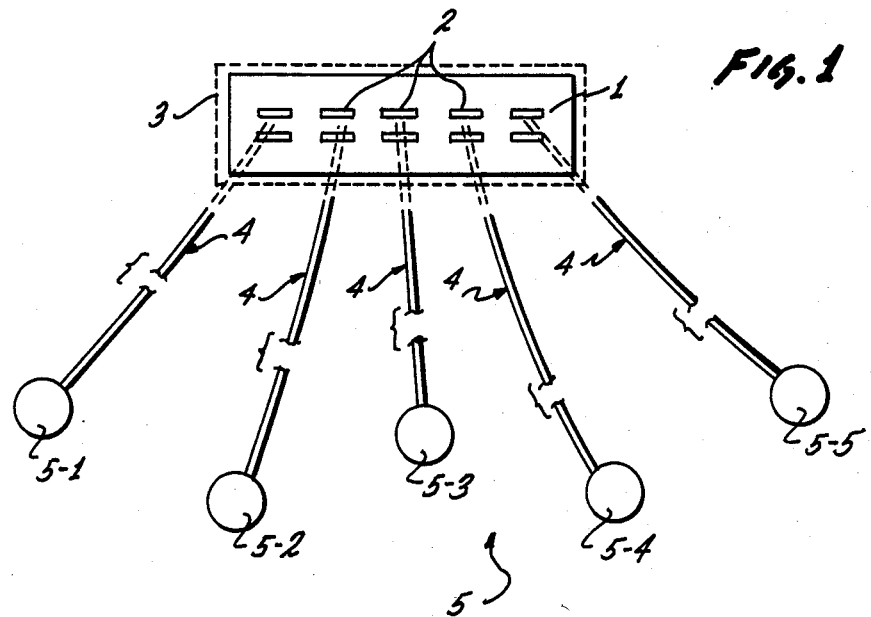
FIG. 1 is a somewhat schematic overview of a system which incorporates signal transmission paths in accordance with the preferred embodiment of the present invention and is constructed for purposes of practicing the best mode thereof.

Proceeding now to FIG. 1, there is illustrated a microprocessor 1 which is for example positioned under the engine hood of an automobile. This particular microprocessor is completely electrically shielded as indicated by the dotted line 3. The shielding is provided in order to make sure that the microprocessor will not pick up external signals. The microprocessor circuit is of course rather small and the area it offers to the receiving of electrical signals of electrical signals is comparatively minimal. Reference numeral 5 refers to a plurality, in this case five different measuring transducers which are connected by means of transmission cable to the microprocessor 1 and here particularly to plug-in connections of the external or input output interface provided for this particular microprocessor. The transmission lines 4 are as long as necessary and the length is basically arbitrary; the interruption indicates the variability of the length.

By way example, one of the transducers, 5-1 may measure the firing angle and its adjustment. Another one, 5-2 may provide an input for the actually occurring firing signal. A third one of the transducers, 5-3 may be connected and respond to the upper dead center, a fourth transducer, 5-4, may be connected to monitor the automatic anti-blocking system for the brakes. Another transducer may monitor the operation of the regular circuit breaker. A still further transducer is provided for measuring the engine speed and another one may provide signal in representation of the speed of the vehicle. Still other input devices and measuring transducers may respond to rotation or speeds and other operational data within an automatic transmission.

It is, moreover, presumed that all measuring data are represented in some form by a variable magnetic field. This may come about for example that a rotating or moving machine part carries a permanent magnet or an electromagnet and the particular input situation to be detected is the passage of that magnet at a particular point. Alternatively the magnetic field may be physically stationary but is distorted by a passing ferromagnetic element. In other instances, a variable magnetic field may be present and existing through conventional tachometer type operation which is of course particularly applicable where a rotational motion is to be monitored, such as a gear transmission speed, an engine speed or the like. Still other instances may be the mere displacement, passage or other shifting of a permanent magnet or of a field modulating yoke, armature or the like. It can readily be seen that practically all situations of a measurement nature can be represented in such a manner that the particular variable to be acquired is in fact represented by a magnetic field or its variations. This means that each of these measuring points can cooperate with a so-called Wiegand probe which in each instance completes the transducing function and can be deemed the immediate pickup for an output generating element for the respective transducer, but Wiegand probe is also an element in the transmission cable and cable system to be described next.

Figure 2:
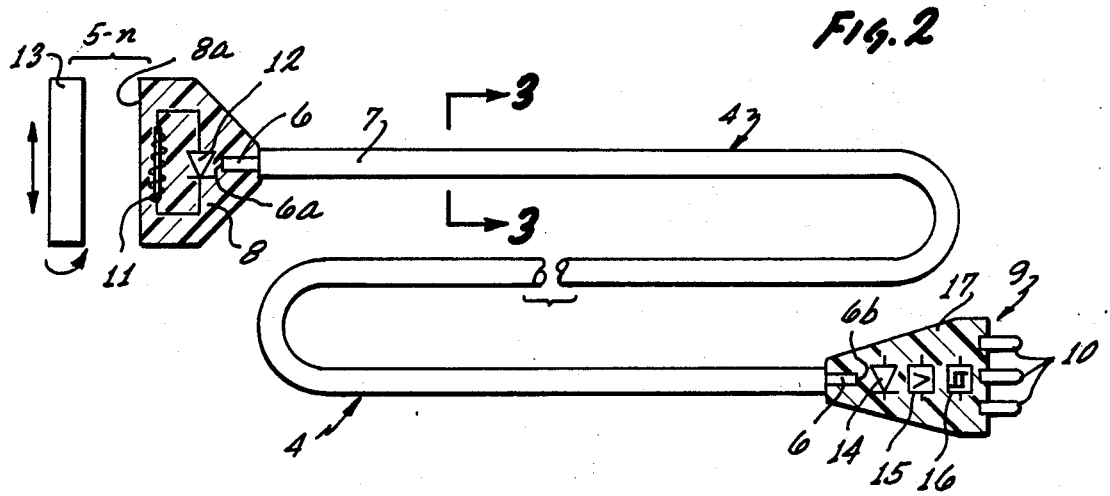
FIG. 2 illustrates by way of example a transmission cable constructed in accordance with the preferred embodiment and being of the type used and incorporated in the system shown in FIG. 1.
Figure 3:
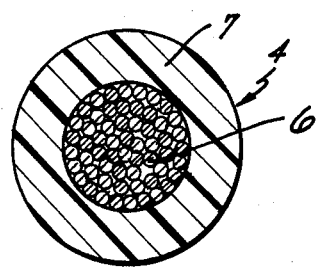
FIG. 3 is a section as indicated by lines III—III in FIG. 2.

Proceeding now to FIGS. 2 and 3, the central element of the transmission cable is a light pipe or light conductor 6 being a single or multiple fiber element and being covered with a layer 7. The light conductor 6 may be a glass fibers or a fiber rod made of transparent synthetic. Moreover, as stated, the conductor may be comprised of fiber bundles which are possibly stranded for purposes of combining them and maintaining them in a uniform physical configuration without changing their light conductive properties.

The jacket 7 may be made of plastic and one can employ here the usual material for electrical insulation such as polyethylene or polyvinylchloride. An immediate electrical insulation is not needed but capacitive pickup and capacitive change of the light conductor should be avoided and for this reason may indeed provide an electrical insulation around the light conductor. Moreover, these conventional electric insulatings are also suitable protective covers, and they are used here for this purpose as well as for moisture-proofing. This insulation is deposited upon the fiber or fiber bundle by means of the usual extrusion molding. The light conductor with cover can be made in an endless fashion and has been stored until cut to its desired length.

After a suitable length has been cut, terminating and connecting devices 8 and 9 are provided at either end. These elements are operatively connected to the light conductor proper and in a manner to be described next. Presently it should be mentioned only that the respective ends of the elements 4 together with end portions of the light conductor from which the insulative cover has been removed, are embedded in molded-on elements 8 and 9. Injection molding may be used here for purposes of providing bodies or elements 8 and 9 which in each instance provide a complete enclosure at and around that particular end of light conductor 6 and merges, probably even fuses in fact with the insulation cover 7. The elements 8 and 9 moreover, seal and moisture-proof the light transducer ends as well as the general components, which are embedded. Additionally, the mold-on plug body 9 supports a plurality of electrical contact pins 10. There may be three such pins, one for electrical signal, one for supplying voltage and the third one for ground potential.

As far as the body 8 is concerned, it encloses and embeds fully and completely a Wiegand probe 11 being electrically connected to an electrooptical transducer 12 such as a lasing diode or a luminescent diode 12. Basically any suitable light generator can be used that responds to a voltage applied to it and emitts electromagnetic radiation of the type that can be transmitted by and through the light conductor 6. Accordingly, the transducer 12 and particularly its optical output window are juxtaposed to the entrance window 6a of the light conductor 6.

The body 8 is disposed and fastened to the point within a system to be supervised in which its Wiegand probe can respond to a variable magnetic field. The variable magnetic field in FIG. 2 is represented by a magnet 13 which can be a permanent magnet as was outlined above or an electromagnet or as stated a portion of an electromagnetic system. Whenever the magnet or magnetic field generating device 13 is connected to a movable part at a particular location thereof, then as stated the location for this particular body 8 defines a pickup point, i.e., a stationary measuring point in relation to which the magnet or magnetic field moves and it is of course exactly the location of the Wiegand probe 11 which constitutes the location of measurement. The magnetic field generator may in fact be a stationary device. A movable part at the point of monitoring may be provided with terrmagnetic means short circuiting locally the magnetic field emanating from magnet 13 upon passage. The resulting local field distortion is picked up by the wiegand probe 11 as the measuring input. Body 8 has a surface 8a through which transduction takes place. The wall portion between that surface and probe 11 is thus appropriately thin, just sufficient to isolate and moisture proof the probe.

It can readily be seen that in response to a change in the magnetic field to which the Wiegand probe 11 is exposed, a change in its electric output is produced which in turn reflects in the generation of an optical signal by the transducing element and diode 12 and, the light signal set into the conductor 6 for propagation therethrough is varied accordingly. Reference numeral 5-m indicates that the Wiegand probe 11 and the magnetic field varying device 13 constitute the input element and transducer for the particular transmission line.

As stated above, the other end of the light conductor carries a plug element 9 which embeds a number of elements. There is first of all a light sensitive detector, i.e. a photo detecting diode or the like 14, which is juxtaposed to the exit window 6b of the light conductor inside of body 9. The particular diode has its output connected to the input terminals of an amplifier 15 which provides signals at a more suitable level and the output of the amplifier 15 in turn is connected for example to a pulse generator 16, i.e. a threshold device which produces one output for a certain range of amplified signals from device 15, and another level is generated by the device 16 for different range of the amplifier output. The signal output of pulse generator 16 is in turn connected to one of the pins 10 so that an electrical signal, i.e. a bi-level signal can be drawn from this receiving device. That particular signal is of course effective in the microprocessor to which the plugs 10 are connected as outlined above.

Figure 4:
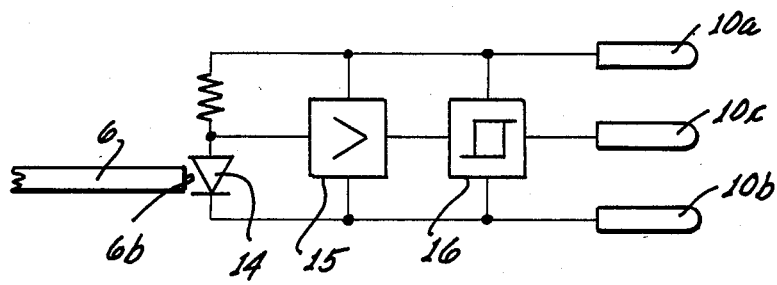
FIG. 4 is an electric circuit diagram in representation of the circuit that is incorporated on the receiver side of the transmission cable shown in FIG. 2.

FIG. 4 illustrates by way of example an electric circuit in which the elements 14, 15 and 16 are incorporated. It can be seen here that the two plugs pins 10a and 10b are provided for respectively feeding power and ground potential to the circuit elements within the body 9, and the amplifier 15 and the pulse generater 16 are connected to these two pins by means of suitable wiring inside body 9. The detector 14 is likewise resistively connected to these two pins. The pin 10b will be connected externally to a source of ground potential while the pin 10a is connected externally to a suitable source of voltage. Strictly speaking, the particular connection external to the plug 9 does not include directly the microprocessor by conceivably the same power supply is used throughout the system while the pin 10b is connected to a common ground potential for establishing a common reference and ground level for the equipment included in the plug 9 as well as in the microprocessor circuit. This ground potential line is shared by the elements 14, 15 and 16 as far as generating an output is concerned which is ultimately derived from the signal bearing pin 10c, being connected to the output terminal of threshold device 16.

As far as making the device is concerned the electric circuit which includes the elements 14, 15 and 16 as well as the pins 10a, 10b, 10c are electrically connected and suitably placed in particular positions in a molding machine. The material 17 of which the plug element 9 consists is then molded around these parts thereby joining them to the cable 4 and particularly the insulation 7 thereof while positively positioning the light detector 14 vis-a-vis the exit window 6b. The molded body 8 is of course made in the same fashion and conceivably these operations may be carried out in one step.

The connector pins 10 of the illustrated configuration are of male type plug elements but of course one could use socket elements instead to be plugged onto pins which extend from the microprocessor 1. The light detector may be a photo diode or photo transistor. The amplifier 15 as well as the pulse generator 15 each may be constructed as so called IC element, conceivably they may even be provided in one integrated configuration. Alternatively, the light receiving diode 14 may be a part of an integrated circuit that includes the amplifier element of device 15.

Figure 5:
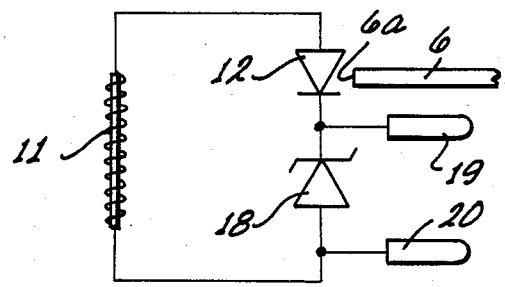
FIGS. 5 and 6 are electrical circuit diagrams of individual portions of the retransmitter side of a cable of the type shown in FIG. 2.

As far as the transmitter side of the cable is concerned, so called light emitting diodes may be used as the electro-optical transducer 12. Such diodes have usually a threshold voltage of about 1.2 volts. In order to make sure that this threshold will in fact be exceeded by the current pulse generated by the Wiegand probe 11, it may be advisable to include in the particular transmitter circuit plug elements and contact pins 19 and 20 for external connection in a voltage source. This is shown in greater detail in FIG. 5 which includes a zener diode 18 in series circuit connection with the Wiegand probe 11 and the light emitting diode 12. The voltage source connected to the pins 19 and 20 can be completely isolated from the microprocessor and its circuit in order to maintain full and complete electrical isolation of both sides of the particular transmission system.

Figure 6:
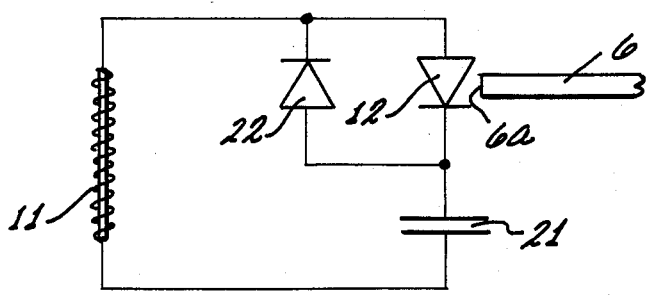

FIG. 6 shows an alternative mode of power supply for the transmitter within this transmission system which does not require the external voltage source, so that body 8 remains fully insulated. The Wiegand probe 11 and the diode 12 are serially interconnected and connected to a capacitor 21 which is likewise embedded within the body 8. The diode 12 is in addition shunted by a diode 22 or a transistor. The particular light emitting diode 12 of course operates only in response to a current flow in one particular direction. It is however inherent in the operation of the Wiegand probe that an output of one polarity causing current flow in one direction is succeeded and preceded by voltage excursions and current flow in the opposite direction. This phenomenon is used here in order to provide additional power in that this reverse current flow is used for purposes of charging the capacitor 21.

The diode 22 is constructed to have a low threshold voltage such as is the case in germanium or silicon diode. It can readily be seen that the capacitor 21 is charged in a particular manner through the diode 22 transistor when the Wiegand probe provides a voltage at a particular polarity. Whenever the magnetic interaction and operation of the Wiegand probe 11 causes a reversal of the voltage it furnishes, that voltage is algebraically added to the capacitor voltage and the subtotal of the two voltages, operating in the same direction, is now in at a level suffient, to drive the light emitting diode 12 at the proper power and voltage level.

It can readily be seen that this particular embodiment shown in FIG. 6 offers the advantage of being capable of operating without an external power supply so that complete electrical isolation of this measuring circuit is guaranteed with absolute certainty. The utilization of this particular structure as shown in FIG. 6 is indeed preferred from the point of view of electrical isolation, but is limited to those situations in which in fact the Wiegand probe 11 is operating in an environment enabling it to pick up sufficient power so that the light emitting diode 12 can be operated at a useful level by the Wiegand probe and the capacitor. Circumstances may make this impossible, in other words, in some instances the magnetic interaction may be comparatively weak so that indeed external power is needed.

Generally speaking it can, therefore, be seen that whenever the Wiegand probe 11 picks up a magnetic field variation it produces a pulse which causes the light emitting diode 12 to emit a light pulse which propagates through the cable 4 and the light conductor 6 thereof, is picked up by the detector 14, amplified in the device 15 and converted into a pulse of suitable shape for utilization in the microprocessor. These three operations are in fact completely isolated from each other because the linkage is clearly an optical one.

One can, therefore, see that the structure 4 constitutes a rather robust and simple device to handle moisture proof signal transmission. The device indeed permits a transmission of signals without interference from electromagnetic stray fields. The input element, body 8 must be positioned to be responsive to a magnetic field variation which is locally produced. That particular end or the transmission line is, of course, sensitive to electromagnetic field variation and conceivably certain protection and shielding steps have to be taken. That however is a question of a very local concern. It simply means that it must be made sure that the magnetic field variations wherever they occur are produced in an otherwise interference-free environment. The cable portion itself will no longer serve as an antenna which picks up interfering signals which is particularly advantageous in the case of the control circuit within an automobile. However, the invention is not limited, as far as application is concerned, to the field of automobile engineering but can be used otherwise and in any environment wherever the intereference free transmission, reception and conduction of signals is mandatory and it can readily be seen that electrical shielding within the transmission system is no longer necessary.

We claim:

1. A remotely effective pick up and transducing system for use in automobiles and being responsive to physical motion adjacent to a particular point and location comprising:

magnetic means provided for converting said motion into a variable, magnetic field at said point and location;

a magnetic field responsive pulse generator disposed at that location in order to be responsive to said variable magnetic field;

an electro-optical transmitter connected to the generator and having a light producing output;

sealing means for moisture proof embedding said pulse generator and said transmitter element and having a wall portion being sufficiently thin for permitting the magnetic field to penetrate the wall portion so as to be responded to by said pulse generator;

a light conductor having two ends respectively establishing entrance and exit windows, the light conductor at its entrance window end terminating inside said sealing means so that said entrance window is likewise embedded in a moisture sealing manner in said sealing means and in a position adjacent to said transmitter;

a light responsive detector disposed adjacent said exit window;

electric circuit means including an amplifier and a pulse forming stage connected to the amplifier, and electrically connected to the detector and establishing an electrical circuit, the circuit having power supply input and signal output terminals and plug pins connected thereto, the output terminals being connected to the pulse forming stage;

second sealing means establishing a plug for moisture proof embedding said light responsive detector, said exit window and said electric circuit means, including said terminals and plug pins; and said plug pins penetrating from said second sealing means but in a moisture sealing manner for providing power to said circuit and extracting output signals therefrom.

2. The system as in claim 1, the respective transmitter element being connected to a likewise embedded capacitor being charged when the generator or the respective probe produces a voltage having a polarity to which the respective transmitter element does not respond so that upon polarity reversal of the voltage the capacitor voltage is added to the voltage provided by the generator for driving the respective transmitter element.

3. The system as in claim 3, the transmitter element being a light emitting diode there being an additional diode with respective lower threshold voltage connected oppositely parallel to the light emitting diode.

4. The system in claim 3 there being a transistor connected in parallel to the transmitter element.

5. The system as in claim 1 the respective transmitter element being connected to a zener diode to which the plug pins are connected.

6. The system as in claim 1 the light conductor being made of glass.

7. The system as in claim 1, the light conductor being made of a transparent synthetic material.

8. The system as in claim 1, the light conductor being constructed from a bundle of light conducting fibers.

* * * * *